Aug. 18, 1936.  C. H. HARRISON  2,051,375
MOTOR CAR, PARTICULARLY THOSE USED FOR AMUSEMENT PURPOSES
Filed May 7, 1935
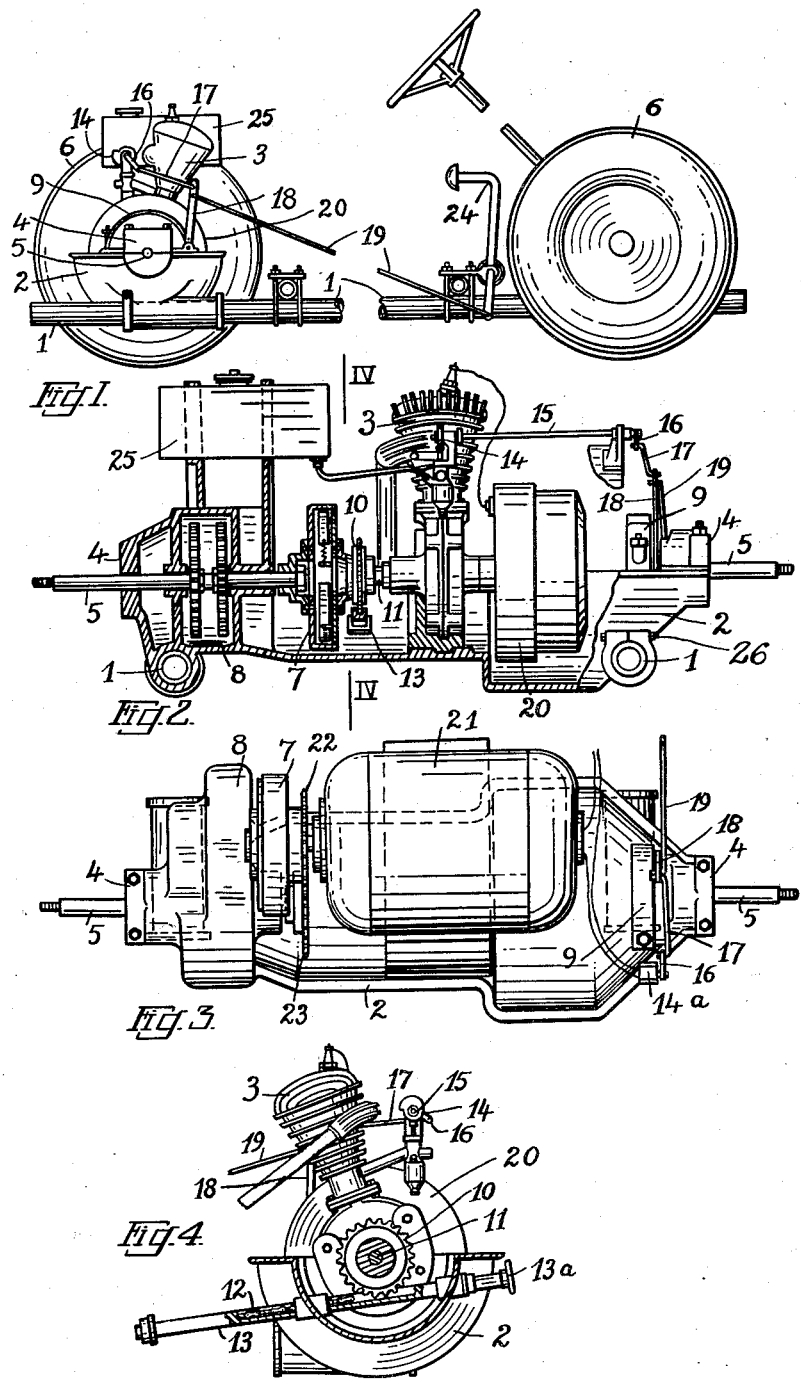
INVENTOR:
Charles Henry Harrison
By Chatwin & Company. Attys.

Patented Aug. 18, 1936

2,051,375

UNITED STATES PATENT OFFICE 2,051,375

MOTOR CAR, PARTICULARLY THOSE USED FOR AMUSEMENT PURPOSES

Charles Henry Harrison, London, England

Application May 7, 1935, Serial No. 20,185
In Great Britain May 18, 1934

4 Claims. (Cl. 180—54)

This invention relates to improvements in motor cars particularly those used for amusement purposes, and has as its object a self contained quickly detachable propulsion unit including road wheels, the main components of the mechanism being arranged in line. Thus in the event of failure of any component thereof the entire assembly may be changed in less time than the fault could be located and rectified.

According to this invention the driving axle is replaced by a frame unit or trough like member adapted to contain or be provided with all the necessary components including an engine or motor with starting gear, fuel tanks and so on, coupled to a known automatic or centrifugal clutch which transmits the power to the gear box or reduction gear from whence the drive is taken to a road wheel.

With a petrol engine all these components are arranged in line and the manufacture is simplified by the fact that all the bearings can be machined at one setting. Where an electric motor is used, owing to its size, it is advantageous to off-set said motor and the clutch so as to have compactness.

The brakes are of course included in this assembly and are advantageously applied automatically to one of the rear wheels as the engine is decelerated.

The invention is shown by way of simple example in the accompanying drawing wherein:

Figure 1 is a side elevation with petrol motor, one rear wheel being removed; Fig. 2 is a part sectional rear view of the complete unit alone; Fig. 3 is a plan view of a construction with offset electric motor; Fig. 4 is a section on IV—IV of Fig. 2.

In the example shown the car chassis may advantageously consist of two tubular members 1 on which the frame unit can be slid and secured fast although obviously any other manner of detachably fitting the frame unit in position can be adopted.

The frame unit may take the form of a trough-like casting 2 bored suitably so as to be engaged with the tubular members 1 forming part of the main frame of the vehicle. The motor 3 and its accessory components or parts are mounted in the frame unit 2 which has appropriate bearings 4 at either side to receive the axles 5 for the road wheels 6. The drive is taken from the motor 3, through the clutch 7 and gear box 8 to the axle 5 of one road wheel and the brake mechanism 9 is mounted in conjunction with the axle 5 for the other road wheel.

The starting mechanism for simplicity consists of a free wheel 10 mounted on the engine shaft 11 and engaging with a rack 12 formed of a chain seated in a channel-shaped member 13 which rack is disengaged from the free wheel during normal running and engaged to start the motor by pulling on the knob 13ᵃ of the member 13 which is longitudinally slidable.

The control is advantageously effected by a single member such as, lever 24, which will cause the acceleration of the engine, thus automatically producing drive through the centrifugal clutch 7 in known manner and when moved in the reverse direction or for instance released, decelerates the engine, thus automatically disconnecting the centrifugal drive, and applying the brakes 9.

This assembly does not depend on any other component of the car for its complete functioning. After the release of two fixing nuts 26 or other fixing means, the entire unit may be removed from the tubular members forming part of the main car chassis.

The starting mechanism may be actuated by the hand control 13a or this may be remotely controlled as for instance by a cable and returned by spring means.

A simple form of combined throttle and brake control consists of a cam 14 acting on the throttle and fitted on a spindle 15 suitably mounted on the frame unit or otherwise, carrying at its free end an arm or the like 16 to which is connected one end of a rod or link 17, the other end of which is connected to an arm 18, the movement of which in one direction or the other applies or releases the brake and which arm and the cam 14 are at the same time actuated through a rod 19 from the brake pedal 24.

The speed reduction gear 8, fuel tank 25 and flywheel magneto 20 are all of known type.

In the case of the electric motor 21 (Fig. 3) the centrifugal clutch 7 is mounted on the motor spindle which carries a chain or gear wheel 22 driving a similar wheel 23 mounted on the main shaft of the gear box 8. The cam 14 would in this case be replaced by a known switch device 14a.

The mechanism described can be applied to a car with front drive, the steering gear being then also included in the frame or drive unit; the road wheel drive can also then be taken through universal joints.

I claim:—

1. A motor car for amusement purposes comprising a chassis frame, front road wheels mounted thereon, a detachable unit mounted on the chassis, said unit carrying rear road wheels, axles carrying said wheels mounted on the unit and starting gear, automatic centrifugal clutch, gear box, and a driving motor mounted in line with said axles and with each other.

2. A motor car comprising a chassis frame, front road wheels mounted thereon, a self contained detachable propulsion unit mounted on said chassis, said propulsion unit consisting of a trough like member, bearings in said trough like member, stub axles mounted in said bearings, rear road wheels mounted on said stub axles, a driving motor mounted in said unit in line with said stub axles, a driving shaft for said motor, starting gear, automatic centrifugal clutch, gear box and magneto mounted in said unit in line with said axles and with each other.

3. A motor car comprising a chassis frame, front wheels thereon, a self-contained detachable frame unit, stub axles mounted thereon, rear wheels carried by said stub axles, a propelling motor carried by said unit, a clutch, speed gear, magnets and brake in line with said stub axles and with each other. a shaft to said motor, and starting mechanism therefor comprising a free wheel mounted on the motor shaft, said free wheel coacting with a chain located in a channel member carried by the unit and means for actuating said starting mechanism.

4. A motor car comprising a chassis, front road wheels thereon, a self contained detachable propulsion frame unit mounted on said chassis, stub axles carried by said frame unit, rear road wheels mounted on said stub axles, one of said wheels being the driving wheel, brake mechanism on the other rear wheel, a petrol motor mounted in said detachable frame unit, a carburetter connected with said motor, the motor and the brake mechanism being in line with the stub axles and with each other, a throttle, a cam acting on the throttle, a lever connected with said cam and with the brake, a hand lever connected with said lever and means connecting the cam lever with the brake, the movement of said hand lever serving to close the throttle and apply the brake mechanism.

CHARLES HENRY HARRISON.